(12) United States Patent
Milton et al.

(10) Patent No.: US 9,589,280 B2
(45) Date of Patent: Mar. 7, 2017

(54) MATCHING ANONYMIZED USER IDENTIFIERS ACROSS DIFFERENTLY ANONYMIZED DATA SETS

(71) Applicant: PlaceIQ, Inc., New York, NY (US)

(72) Inventors: Stephen Milton, Lyons, CO (US); Duncan McCall, Greenwich, CT (US)

(73) Assignee: PlaceIQ, Inc., New York, NY (US)

( * ) Notice: Subject to any disclaimer, the term of this patent is extended or adjusted under 35 U.S.C. 154(b) by 376 days.

(21) Appl. No.: 14/334,066

(22) Filed: Jul. 17, 2014

(65) Prior Publication Data

US 2015/0026181 A1     Jan. 22, 2015

Related U.S. Application Data

(60) Provisional application No. 61/847,083, filed on Jul. 17, 2013.

(51) Int. Cl.
*G06F 17/30* (2006.01)
*G06Q 30/02* (2012.01)

(52) U.S. Cl.
CPC ................ *G06Q 30/0269* (2013.01)

(58) Field of Classification Search
None
See application file for complete search history.

(56) References Cited

U.S. PATENT DOCUMENTS

2009/0248680 A1* 10/2009 Kalavade .......... G06Q 30/0267
2011/0238829 A1   9/2011 Brunell et al.
2012/0203639 A1   8/2012 Webster et al.
2012/0215640 A1   8/2012 Ramer et al.
2013/0061050 A1*  3/2013 Davis ................ G06Q 10/06
                                                            713/168
2013/0081141 A1*  3/2013 Anurag .................. G06F 21/55
                                                            726/23
2013/0124315 A1   5/2013 Doughty et al.
2013/0198281 A1   8/2013 Scuba et al.
2013/0282438 A1  10/2013 Hunter et al.
2014/0012739 A1   1/2014 Wall et al.

(Continued)

OTHER PUBLICATIONS

De Mulder et al., "Identification via location-profiling in GSM networks," WPES'08, Oct. 27, 2008, Alexandria, Virginia, USA.*

(Continued)

*Primary Examiner* — Jay Morrison
(74) *Attorney, Agent, or Firm* — Pillsbury Winthrop Shaw Pittman LLP

(57) ABSTRACT

Provided is a process of obtaining a plurality of location data sets from different providers of user geolocation history, each location data set including a plurality of user-activity records, each user-activity records being associated with a user identifier and including geolocations of the corresponding user and times that the corresponding user was at the geolocations, the different providers having different user identifiers for a given corresponding user; matching, by one or more processors, the user identifiers between the location data sets based on geolocations of the corresponding user and times that the corresponding user was at the geolocations; and storing the matched user identifiers in association with one another in corresponding user profiles.

26 Claims, 6 Drawing Sheets

(56) References Cited

U.S. PATENT DOCUMENTS

2015/0006529 A1* 1/2015 Kneen ............... G06F 17/30864
707/736

OTHER PUBLICATIONS

Zang et al., "Anonymization of Location Data Does Not Work: A Large-Scale Measurement Study," MobiCom'11, Sep. 19-23, 2011, Las Vegas, Nevada, USA.*
'CLLocationManager Class Reference', https://developer.apple.com/library/ios/documentation/CoreLocation/Reference/CLLocationManager_Class/CLLocationManager/CLLocationManager.html, Sep. 18, 2013, pp. 1-23.
'Location Provider', http://developer.android.com/reference/android/location/LocationProvider.html, Jul. 8, 2014, pp. 1-4.
'Mobile phone carriers can collect, share location data', www.unionleader.com/article/20120805/ NEWS02/708059957&source=RSS, Aug. 4, 2012, pp. 1-4.
'PlaceIQ Transforms Time and Location into Context', https://web.archive.org/web/20120702123659/http://www.placeiq.com/, Jul. 2, 2012, pp. 1-2.
'PlaceIQ Transforms Time and Location into Context', https://web.archive.org/web/20130629102835/http://www.placeiq.com/, Jun. 29, 2013, pp. 1-2.

* cited by examiner

MATCHING ANONYMIZED USER IDENTIFIERS ACROSS DIFFERENTLY ANONYMIZED DATA SETS

CROSS-REFERENCE TO RELATED APPLICATIONS

The present application claims the benefit of U.S. Provisional Patent Application 61/847,083 filed 17 Jul. 2013, titled "Matching Anonymized User Identifiers Across Differently Anonymized Data Sets." The content of this parent application is incorporated by reference in its entirety for all purposes.

BACKGROUND OF THE INVENTION

1. Field of the Invention

The present invention relates generally to user profiles and, more specifically, to generating user profiles based on locations identified by matching anonymized user identifiers across differently anonymized data sets.

2. Description of the Related Art

User profiles are useful in a variety of contexts. For example, advertisers often purchase advertising based on a desire to reach potential customers having particular attributes. Such advertisers often employ user profiles to select when, where, or how the advertiser conveys their message. Similarly, market researchers may analyze user profiles to better understand the market for a given good or service based on attributes of buyers of that good or service. In another example, user profiles may be used to customize products or services, for instance, by customizing a software application according to the profile of a user of the software application, or user profiles may be used by governmental agencies to allocate services to geographic areas according to profiles of users in those areas.

User profiles, however, can be difficult to obtain, as users generally have little incentive to generate a profile of themselves for use by others. Such a task can be tedious and unpleasant. Further, users' recollection of their behavior over time can be unreliable.

Instead, advertisers (and other consumers of user profiles) often rely on user profiles generated based on activities of users on various networks or other distributed systems (e.g., cell carriers, ad networks, native applications on smart phones, etc.). Forming such profiles can be difficult, though, because data from individual sources is often insufficient to reliably profile users and the data is often anonymized.

Frequently, available data identifies users uniquely within a given data provider's system, but does not identify users canonically, as each data provider often has a different unique ID for the same user. This is typically done to comply with privacy policies of the data providers. But as a result, it is difficult to match a record about a user from one data provider with a record about the same user from another data provider. Also, when users update their equipment, e.g., with a new cell phone, it can be difficult to tie their existing profile to data from the new equipment, as the third party user identifiers are often based on identifiers of the equipment (e.g., a data-provider-specific hash of a media access control (MAC) address or an advertiser identification number of the device).

SUMMARY OF THE INVENTION

The following is a non-exhaustive listing of some aspects of the present techniques. These and other aspects are described in the following disclosure.

In some aspects, the present techniques include a process of profiling a user of a mobile computing device, the process including: obtaining a location history of a user, the location history being based on signals from a mobile computing device of the user; obtaining a location-attribute score of a location identified in, or inferred from, the location history; determining, with a computer, a user-attribute score based on the location-attribute score; and storing the user-attribute score in a user-profile datastore.

In some aspects, the present techniques include a process of obtaining a plurality of location data sets from different providers of user geolocation history, each location data set including a plurality of user-activity records, each user-activity records being associated with a user identifier and including geolocations of the corresponding user and times that the corresponding user was at the geolocations, the different providers having different user identifiers for a given corresponding user; matching, by one or more processors, the user identifiers between the location data sets based on geolocations of the corresponding user and times that the corresponding user was at the geolocations; and storing the matched user identifiers in association with one another in corresponding user profiles.

In some aspects, the present techniques include a process of obtaining a data set including a plurality of records, each record being associated with a user identifier and including geolocations of the corresponding user and times that the corresponding user was at the geolocations; determining that two user identifiers refer to the same user by matching, with one or more processors, the user identifiers within the data set based on geolocations of the corresponding user and times that the corresponding user was at the geolocations; and storing the matched user identifiers in a user profile of the corresponding user.

Some aspects include a tangible, machine-readable, non-transitory medium storing instructions that when executed by a data processing apparatus, cause the data processing apparatus to perform operations including those listed above.

Some aspects include a system, including: one or more processors; and memory storing instructions that when executed by the processors cause the processors to perform operations including those listed above.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
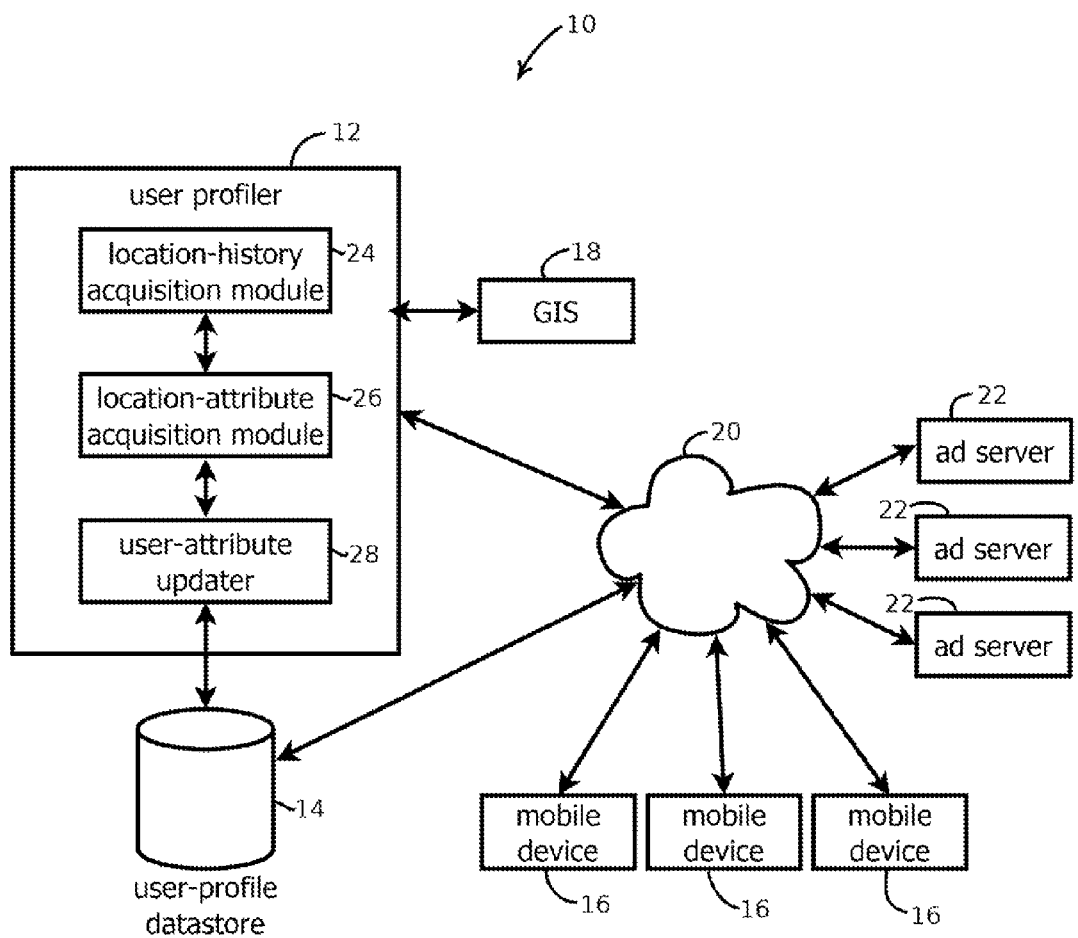
FIG. 1 shows an example of an environment in which a user profiler operates in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in user profiling and mobile device usage continue as applicants expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 shows an example of a computing environment 10 having a user profiler 12 operative to generate user profiles to be stored in a user-profile datastore 14. In some embodiments, the user profiler 12 generates (for example, instantiates or updates) the user profiles based on location histories from mobile devices 16 and attributes of geographic locations stored in a geographic information system 18. The resulting user profiles may reflect the attributes of the locations visited by users. The location histories may be conveyed via the Internet 20 to remote locations, and the user profiles may be used by advertisement servers 22 to select advertisements for presentation to users or for other purposes described below.

The profiles may characterize a variety of attributes of users. In one illustrative use case, a location history may indicate that a user frequently visits geographic locations associated with tourism, and the profile of that user may be updated to indicate that the user frequently engages in tourism, which may be of interest to certain categories of advertisers. Or a user may spend their working hours in geographic areas associated with childcare and residences, and based on their location history, the profile of that user may be updated to indicate that the user likely engages in childcare for children younger than school age. Other examples are described below.

Further, as explained in detail below, the attributes associated with geographic locations may vary over time (for example, an area with coffee shops and bars may have a stronger association with consumption of breakfast or coffee in the morning, an association which weakens in the evening, while an association with entertainment or nightlife may be weaker in the morning and stronger in the evening). User profiles may be generated in accordance with the time-based attributes that predominate when the user is in a geographic area. And in some embodiments, user profiles may also be segmented in time, such that a portion of a given user's profile associated with a weekday morning may have different attributes than another portion of that user's profile associated with a weekend night, for instance.

The user profiles may be used by advertisers and others in a privacy-friendly fashion, such that users are expected to tend to opt in to sharing their location history. For example, the user profiles may be aggregated to identify geographic areas having a high density of a particular type of user at a particular time of the week, such as a sports stadium having a relatively large number of users associated with fishing as a hobby, or a children's soccer field in which a relatively large number of people associated with golfing as a hobby might tend to co-occur on weekend mornings. Such correlations may be presented to advertisers or others without disclosing information by which individual users can be uniquely identified. In other applications, user-specific information may be provided, for example, users who opt in to sharing their profiles may receive user-specific services or communications formulated based on the individual profile of that user.

Accounting for time when characterizing geographic areas is believed to yield relatively accurate characterizations of places, as the activities that people engage in at a given location tend to depend strongly on time of day and week. And for similar reasons, accounting for time when profiling users is expected to yield relatively accurate characterizations of the users. Generating profiles based on location history further offers the benefit of profiling users without imposing the burden of manually doing so on the users themselves, and using attributes of geographic areas in which the user travels is expected to yield relatively privacy-friendly data about the user. That said, not all embodiments offer all, or any, of these benefits, as various engineering and cost trade-offs are envisioned, and other embodiments may offer other benefits, some of which are described below.

As noted above, the user profiler 12 obtains data from the mobile devices 16 and the geographic information system 18 to output user profiles to the user-profile datastore 14 for use by the ad servers 22 or for other purposes. Accordingly, these components are described in this sequence, starting with inputs, and concluding with outputs.

The mobile devices 16 maybe any of a variety of different types of computing devices having an energy storage device (e.g., a battery) and being capable of communicating via a network, for example via a wireless area network or a cellular network connected to the Internet 20. In some cases, the mobile devices 16 are handheld mobile computing devices, such as smart phones, tablets, or the like, or the mobile devices may be laptop computers or other special-purpose computing devices, such as an automobile-based computer (e.g., an in-dash navigation system). The mobile devices 16 may have a processor and a tangible, non-transitory machine-readable memory storing instructions that provide the functionality described herein when executed by the processor. The memory may store instructions for an operating system, special-purpose applications (apps), and a web browser, depending upon the use case. It should be noted, however, that the present techniques are not limited to mobile devices, and other computing devices subject to geolocation may also generate data useful for forming user profiles. For instance, set-top boxes, gaming consoles, or Internet-capable televisions may be geolocated based on IP address, and data from user interactions with these devices may be used to update user profiles, e.g., with user interaction indicating a time at which a user was at the geolocation corresponding to the device.

This software may have access to external or internal services by which the location of the mobile device may be obtained. For example, the mobile device may have a built-in satellite-based geolocation device (for instance a global-positioning system, or GPS, device or components operative to obtain location from other satellite-based systems, such as Russia's GLONASS system or the European Union's Galileo system). In another example, location may be obtained based on the current wireless environment of the mobile device, for example by sensing attributes of the wireless environment (e.g. SSIDs of wireless hotspots, identifiers of cellular towers and signal strengths, identifiers of low energy Bluetooth beacons, and the like) and sending those attributes to a remote server capable of identifying the location of the mobile device. In some embodiments, the location may be obtained based on an identifier of a network node through which the mobile device connects to the Internet, for example by geocoding an IP address of a wireless router or based on a location of a cellular tower to which the mobile device is connected. The location may be expressed as a latitude and longitude coordinate or an area, and in some cases may include a confidence score, such as a radius or bounding box defining area within which the device is expected to be with more than some threshold confidence.

From time to time, the location of the mobile devices 16 may be obtained by the mobile devices. For example, when a user interacts with a special-purpose application, in some cases, the application may have permission to obtain the location of the mobile device and report that location to a third party server associated with the application, such that the location may be obtained by the user profiler 12 from the third party server. In another example, the user may visit a website having code that obtains the current location of the mobile device. This location may be reported back to the server from which the website was obtained or some other third party server, such as an ad server for an affiliate network, and location histories may be obtained from this server. In another example, locations of the mobile devices 16 may be obtained without the participation of the mobile device beyond connecting to a network. For instance, users may opt in to allowing a cellular service provider to detect their location based on cellular signals and provide that location to the user profiler 12. Depending upon how location is obtained, the location may be acquired intermittently, for example at three different times during a day when a user launches a particular application, or relatively frequently, for example by periodically polling a GPS device and reporting the location. In some cases, the location history may include locations obtained more than one-second apart, more than one-minute apart, more than one-hour apart, or more, depending upon the use case.

Locations may be obtained in real time from mobile devices 16 by the user profiler 12, or in some embodiments, location histories may be obtained, e.g., from third party data providers using the process and systems described below with reference to FIGS. 4-5. Each location history may include records of geographic locations of a given mobile device and when the mobile device was at each location. In some cases, a location history may include records of location over a relatively long duration of time, such as more than over a preceding hour, day, week, or month, as some modes of acquiring location histories report or update location histories relatively infrequently. A location history for a given mobile device may include a plurality (e.g., more than 10 or more than 100) location records, each location record corresponding to a detected location of the mobile device, and each location record including a geographic location and the time at which the mobile device was at the location. The location records may also include a confidence score indicative of the accuracy of the detected location. Geographic locations may be expressed in a variety of formats with varying degrees of specificity, for example as a latitude and longitude coordinates, as tiles in a grid with which a geographic area is segmented (e.g., quantized), or in some other format for uniquely specifying places.

The geographic information system 18 may be configured to provide information about geographic locations in response to queries specifying a location of interest. In some embodiments, the geographic information system 18 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example approximately 100-meters per side, depending upon the desired granularity with which a geographic area is to be described. In other examples, the tiles have other shapes, e.g., hexagon shapes that are arranged in a two-dimensional hexagonal packing layout.

In some cases, the attributes of a geographic area change over time. Accordingly, some embodiments divide each tile according to time. For instance, some embodiments divide each tile into subsets of some period of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. Each of these durations may be profiled at each tile.

In some embodiments, the geographic information system 18 includes a plurality of tile records, each tile record corresponding to a different subset of a geographic area. Each tile record may include an identifier, an indication of geographic area corresponding to the tile (which for regularly size tiles may be the identifier), and a plurality of tile-time records. Each tile-time record may correspond to one of the above-mentioned divisions of time for a given tile, and the tile-time records may characterize attributes of the tile at different points of time, such as during different times of the week. Each tile-time record may also include a density score indicative of the number of people in the tile at a given time. In some embodiments, each tile-time record includes an indication of the duration of time described by the record (e.g. lunch time on Sundays, or dinnertime on Wednesdays) and a plurality of attribute records, each attribute record describing an attribute of the tile at the corresponding window of time during some cycle (e.g., weekly).

The attributes may be descriptions of activities in which users engage that are potentially of interest to consumers of the user-profile datastore 14. For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time.

Thus, to use some embodiments of the geographic information system 18, a query may be submitted to determine what sort of activities users engage in at a particular block in downtown New York during Friday evenings, and the geographic information system 18 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Attribute scores may be normalized, for example a value from 0 to 10, with a value indicating the propensity of users to exhibit behavior described by that attribute.

The user profiler 12 may join the location histories and tile records implicated by locations in those location histories to generate user profiles. Thus, users may be characterized according to the attributes of the places those users visit at the time the user visits those places. The generated user profiles may then be stored by the user profiler 12 in the user-profile datastore 14, as described below. To this end, or others, some embodiments of the user profiler 12 includes a location-history acquisition module 24, a location-attribute acquisition module 26, and a user-attribute updater 28 operative to generate user profiles.

The user profiler 12 may be constructed from one or more of the computers described below with reference to FIG. 6. These computers may include a tangible, non-transitory, machine-readable medium, such as various forms of memory storing instructions that when executed by one or more processors of these computers (or some other data processing apparatus) cause the computers to provide the functionality of the user profiler 12 described herein. The components of the user profiler 12 are illustrated as discrete functional blocks, but it should be noted that the hardware and software by which these functional blocks are implemented may be differently organized, for example, code or hardware for providing the this functionality may be intermingled, subdivided, conjoined, or otherwise differently arranged.

The illustrated location-history acquisition module 24 may be configured to acquire location histories of mobile devices 16 via the Internet 20. The location histories may be acquired directly from the mobile devices 16, or the location histories may be acquired from various third parties, such as a third-party hosting Web applications rendered on the mobile devices 16, third parties hosting servers to which location histories are communicated by apps on the mobile devices 16, or third parties providing network access to the mobile devices 16, such as cellular service providers, for example. The location-history acquisition module 24 may include a plurality of sub-modules for obtaining location histories from a plurality of different providers. These sub-modules may be configured to request, download, and parse location histories from a respective one of the different providers via application program interfaces provided by those providers. The sub-modules may normalize the location histories from the different providers, which may be in different formats, into a common format for use in subsequent processing. Location histories may be acquired periodically, for example monthly, weekly, or hourly, or more frequently.

The user profiler 12 of this embodiment further includes the location-attribute acquisition module 26. The module 26 may be configured to obtain attributes of locations identified based on the location histories acquired by the location history acquisition module 24. For example, the module 26 may be configured to iterate through each location identified by each location history and query the geographic information system 18 for attributes of those locations at the time at which the user was at the corresponding location. In some cases, the location-attribute acquisition module 26 may also request attributes of adjacent locations, such as adjacent tiles, from the geographic information system 18 so that the user-attribute updater 28 can determine whether a signal from a given tile is consistent with that of surrounding tiles for assessing the reliability of various indications.

The acquired location histories and location attributes may be provided by modules 24 and 26 to the user-attribute updater 28, which in some embodiments, is configured to generate user profiles based on this data. In some cases, the user-attribute updater 28 is operative to perform portions of the processes of FIG. 2 or 3, described in detail below, and attach attributes of places visited by users to the profile of those users. These profiles may be stored by the user attribute updater 28 in the user-profile datastore 14.

The user profile datastore 14 may be operative to store user profiles and, in some embodiments, address queries for data in the user profiles. The illustrated user-profile datastore 14 includes a plurality of user-profile records, each record corresponding to the profile of a given user or a given mobile device 16. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose application, a cell phone number, or some other value, which may be hashed to enhance user privacy).

Each user-profile record may also include a plurality of profile time records indicating attributes of the user profile at different times during some cycle of time (e.g., portions of the week or month, or during other periods like those described above with reference to the geographic information system 18). In some cases, the profile-time records may correspond to the same durations of time as those of the time-tile records described above. Each profile-time record may include an indication of the duration of time being described (e.g. Thursday's at dinnertime, or Saturday mid-morning) and a plurality of profile attribute records, each profile attribute record indicating the propensity of the corresponding user to engage in an activity described by the attribute during the corresponding time of the profile-time record. The profile time records may allow tracking of when users tend to engage in a given activity (time of day, day of week, week of year). In some embodiments, the profile attribute records correspond to the same set of attribute records described above with reference to the geographic information system 18. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, advertisers operating ad servers 22 may submit to the user-profile datastore 14 a query identifying one of the user-profile records, such as the above-mentioned hashed value of a user account number or phone number, and the user-profile datastore 14 may respond with the attributes of the corresponding user at the current time. In some embodiments, to further enhance user privacy, queries may be submitted for a specific attribute to determine whether to serve an advertisement corresponding to the attribute, or a query may request a binary indication of whether the attribute score is above a threshold.

In another example, the user-profile datastore 14 may be used by the user profiler 12 to augment the records in the geographic information system 18. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf, tend to be during various times of the day, such that advertisers can select advertisements based on this information. In some embodiments, an index may be created for each user attribute at each of the above-described divisions of time in the geographic information system 18, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats on a billboard along that road in response. Other examples relating to customization of software and services and other forms of analysis are described in greater detail below.

In short, some embodiments of the computing environment 10 generate user profiles that are relatively privacy-friendly to users and consume relatively little effort on the part of users or others to create the profiles. These advantages are expected to yield a relatively comprehensive set of relatively high-resolution user profiles that may be used by advertisers and others seeking to provide information and services customized to the unique attributes of each user, facilitating the presentation of high-value and high-relevance advertisements and services to users while respecting the users' interest in privacy. That said, not all embodiments provide these benefits, and some embodiments may forgo some or all of these embodiments in the interest of various engineering trade-offs relating to time, cost, and features.

Figure 2:
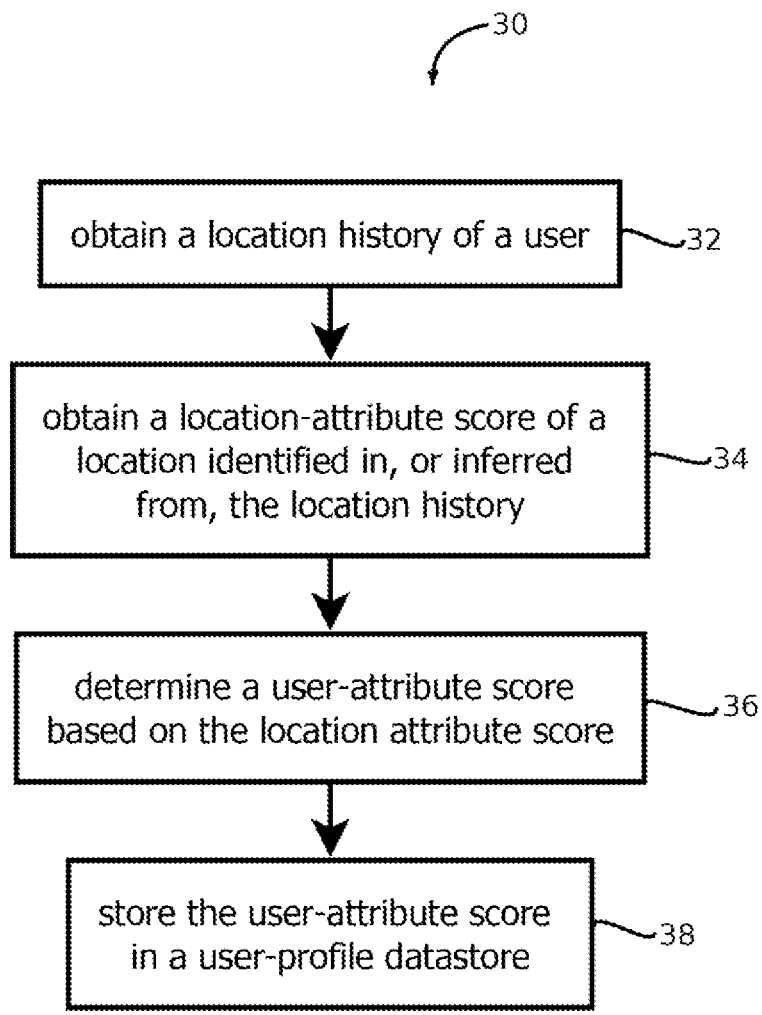
FIG. 2 shows an embodiment of a process for profiling a user.

FIG. 2 illustrates an embodiment of a process 30 that may be performed by the above-describes user profiler 12. The steps of the process 30 (and other processes described herein) may be performed in a different order than the order in which the steps are described. In some embodiments, the process 30 includes obtaining a location history of a user, as illustrated by block 32. This step may be performed by the above-described location-history acquisition module 24. As noted above, location histories may be obtained from a plurality of different providers of location histories, and the location histories may be reformatted into a common format for subsequent processing.

The process 30 of this embodiment further includes obtaining a location-attribute score of a location identified in, or inferred from, the location history, as indicated by block 34. This step may be performed by the above-described location-attribute acquisition module 26. The location-attribute score may be one of a plurality of scores corresponding to a time-tile record described above.

In some embodiments, locations identified in the location history may be relatively sparse, and intermediate locations between those explicitly identified may be inferred. For example, the user profiler 12 may determine that two locations are more than a threshold amount of time apart and a threshold distance apart, indicating that the user likely traveled between the location during the intermediate time. In response, the user profiler 12 may query the geographic information system 18 for locations associated with travel, such as locations corresponding to an interstate highway, between the two locations, and the locations along the interstate highway (or associated with some other mode of travel) may be added to the location history at the intermediate times as inferred locations. Inferring intermediate locations is expected to yield a more comprehensive characterization of the user's profile.

In some embodiments, the process 30 further includes determining a user-attribute score based on the location attribute score, as indicated by block 36. Determining a user-attribute score may include incrementing a sample size for the corresponding attribute in the user profile and calculating an updated average attribute score. An average is one of a variety of different forms of measures of central tendency that may be used to determine the user-attribute score. In other embodiments, previous attribute scores of locations visited by the user may be stored in memory, and a median or mode score may be calculated using the newly obtained location-attribute score and those stored in memory. Thus, deviations indicating one-time instance in which the user engaged in a particular activity will tend to have a relatively small effect on the user profile, as previous location histories will likely indicate a relatively low propensity to engage in a particular activity and dilute the effect of a single instance.

In some embodiments, the process 30 further includes storing the user-attribute score in a user-profile datastore, as indicated by block 38. As noted above, this may include updating indices corresponding to various attributes in a geographic information system, and the stored user profiles may be queried by advertisers and others seeking to provide targeted messaging and services. Targeting may be toward specific users who are profiled or to the places profiled users visit or based on patterns in attribute scores among profiled users.

Figure 3:
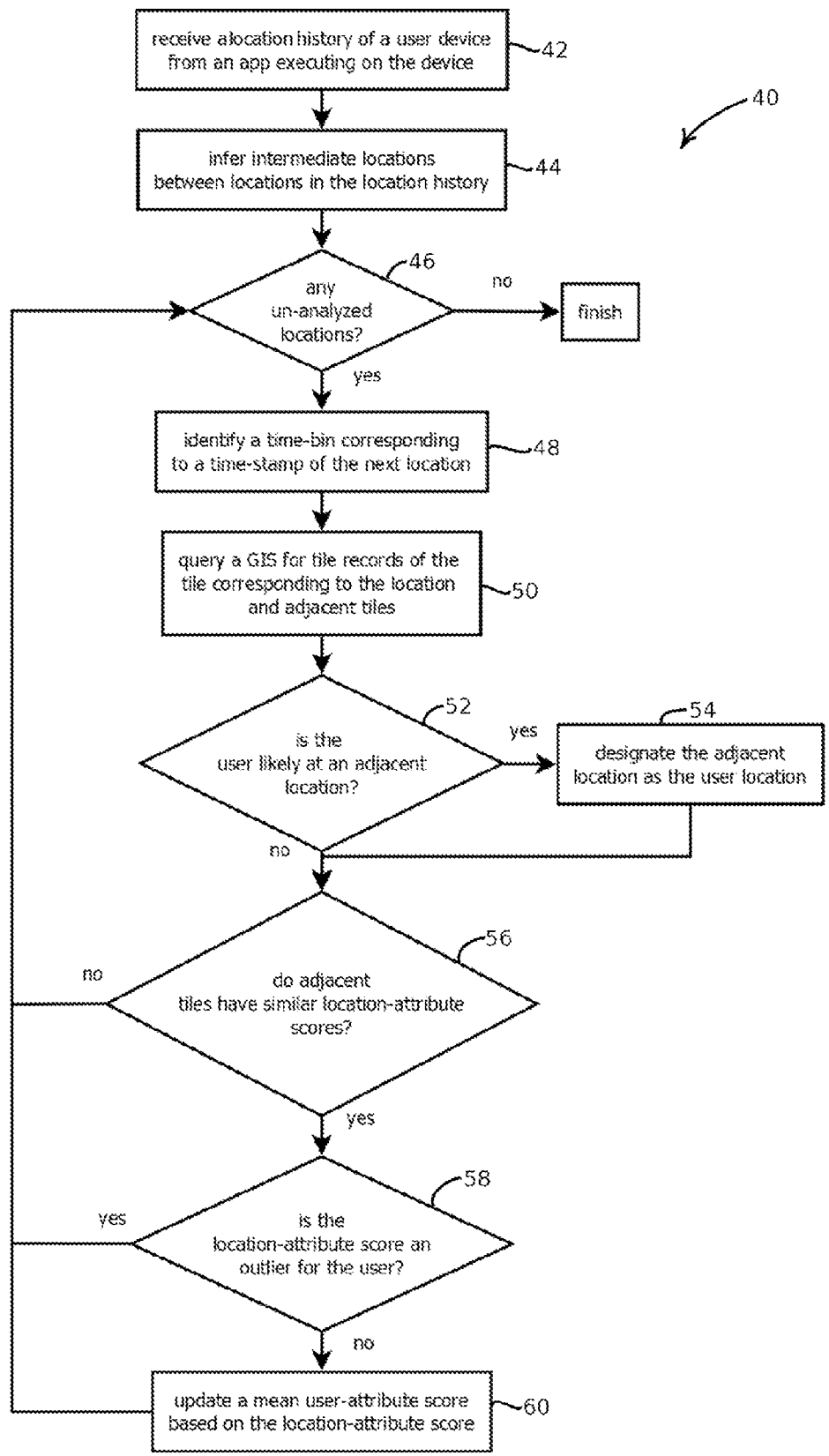
FIG. 3 shows an embodiment of another process for profiling a user.

FIG. 3 illustrates another embodiment of a process 40 for generating user profiles. This process may be performed by the above-mentioned user profiler 12. The illustrated process begins with receiving a location history of a mobile user device from an application executed on the device, as illustrated by block 42. Next, intermediate locations are inferred between locations in the location history, as indicated by block 44. As noted above, some embodiments may identify gaps in the location history and infer intermediate locations based on attributes of tiles between the boundaries of the gap, selecting, for example, intermediate tiles associated with transit. In this embodiment, the process 40 includes determining whether there are any un-analyzed locations in the location history, as indicated by block 46. Upon determining that no such locations remain, the process completes. Alternatively, upon determining that locations remain to be analyzed, the process 40 in this embodiment proceeds to identify a time-bin corresponding to a timestamp of the next location in the location history, as indicated by block 48. The time-bin may be one of the above-describes durations of time by which tiles or user profiles are characterized. The corresponding time bin may be the time bin in which the timestamp of the use location falls. Next, this embodiment of process 40 includes querying a geographic information system for tile records of the tiles corresponding to the location and adjacent tiles, as indicated by block 50.

In some embodiments, the process 40 further includes determining whether the user is likely at an adjacent location, as indicated by block 52. Such a determination may include making the determination based on the attributes of the adjacent tiles or density scores for the tiles corresponding to the timestamp of the user location in question. For example, attribute scores for the location in the location history may indicate that less than a threshold amount of user activity occurs within the tile corresponding to that location (e.g., a density value indicative of the number of people in the tile may be below a threshold), while attribute scores for one of the adjacent tiles may indicate a relatively high density or amount of activity (e.g., more than a threshold, or more than a threshold difference from the adjacent tile) for one or more attributes. In response to this difference, it may be determined that the location in the location history is in error (for instance, due to an inaccurate GPS reading), and the adjacent location may be selected as being a more likely location of the user. Some embodiments may select the adjacent location having the highest density or aggregation of attribute scores, for example. Thus, some embodiments may designate the adjacent location as the user location, as indicated by block 54, or in response to a negative determination in block 52, some embodiments may proceed to the next step without such a designation occurring.

Embodiments may further include determining whether adjacent tiles have similar location-attribute scores, as indicated by block 56. Because location measurements by mobile devices are often relatively inaccurate, there is some risk that the user is not at the location identified and is instead in an adjacent tile. However, if the adjacent tiles have similar attribute scores, those attributes can be attributed to the user with a relatively high degree of confidence regardless of whether the user is in the exact tile identified by the location in the location history. Accordingly, some embodiments may determine whether the adjacent tiles have similar location attribute scores (at the time in question for the user location), for example attribute scores less than a threshold difference for more than a threshold number of attributes. Other embodiments may calculate a confidence score based on the similarity of adjacent tiles and weight the modification of the user profile based on the confidence score, down weighting signals in instances in which the adjacent tiles are relatively different from one another, or a binary determination may be made as illustrated in FIG. 3. Upon determining that adjacent tiles do not have similar location-attribute scores, some embodiments return to block 46. Alternatively, the process may proceed to the next step.

Some embodiments of process 40 may include determining whether the location-attribute score is an outlier for the user, as indicated by block 58. This step may include iterating through each location attribute score of the user's location and comparing that attribute score at the time in question to a corresponding attribute score in the users profile to identify uncharacteristic behavior indicative of a potentially misleading signal. In some embodiments, attributes may be designated as an outlier in response to the location attribute score exceeding a threshold difference from the average, for example location attribute scores more than three standard deviations higher or lower than the average attribute score in the user profile for a given attribute. In some embodiments, the determination of step 58 is made for each of a plurality of attributes of the location, and those attributes deemed to be outliers may be filtered before proceeding to the next step, or some embodiments may return to step 46 in response to the detection of an outlier. Some implementations may use a similarity model to detect inaccurate signals in acquired location histories. Using such models, embodiments may filter out questionable location readings so as not to pollute profile development. For instance, a reliability database similar to the GIS may be referenced during profile analysis by submitting a query with metadata about entries in a location history (e.g., publisher, time of day, location, OS, device type, location determination method (e.g. GPS vs. WiFi™ or other wireless network)). The reliability database may provide a response indicative of the predicted level of accuracy of the incoming location. The reliability database may store data from sources know to be reliable, and this data may indicate expected levels of activity at a location. If a specific data set diverges significantly from this (e.g., attribute scores for a tile are more than a threshold amount different from those in the reliability database), in response, the user profiler may flag the location history as likely being less accurate, and based on such flags, the data may be discarded or changes to user profiles may be down weighted.

Upon determining that the location-attribute score is not an outlier, the process 40 proceeds to step 60, and a mean user-attribute score is updated based on the location-attribute score. Updating the user-attribute score may include updating each of a plurality of user-attribute scores based on a plurality of location-attribute scores that were not filtered out in step 58. Updating the user-attribute score may include multiplying the current score by a count of measurements upon which that score is based, adding to the resulting product the location-attribute score, and dividing this some by the count plus one to calculate a new average user-attribute score. This value and incremented version of the count may be stored in a corresponding attribute record in the user profile.

The process 40 may be repeated for each of a relatively large number of location histories, each location history corresponding to a different user profile. The process 40 may be repeated periodically, for example nightly, weekly, or monthly to update user profiles and instantiate new user profiles. The resulting user profiles may be stored in the above-mentioned user-profile datastore 14.

In some cases, after updating user profiles, various indices may be formed to expedite certain queries to the geographic information system 18. For example, some embodiments may form an index keyed to each attribute for which a score is maintained in the tile records or the user-profile records. For example, embodiments may calculate an index that identifies each tile in which users having more than a threshold score for a given attribute co-occur during one of the above-described time bins (e.g., by multiplying a density score for each tile with an attribute score and thresholding the resulting product). This index may be used to relatively quickly determine whether a given geographic area at a given time is correlated with a given attribute and has a high density of people exhibiting behavior described by that attribute. Further, some embodiments may use such an index to identify geographic areas in which a collection of attributes are relatively strong, for instance determining the union of the set of values corresponding to each of a plurality of different attributes to identify, for instance, where users associated with golfing, fishing, and tourism are at a relatively high concentration on mid-afternoons on Sundays.

Embodiments of the process 40 may be performed concurrently on multiple computing devices to expedite calculations. For instance, a master computing device may iterate through a list of user device identifiers and assign profiling tasks to each of a plurality of profiling computing devices, each of which determine corresponding profiles for different users at the same time. Using similar techniques, the formation of indices may also be parallelized. For instance, each attribute may be assigned to a different set of computing devices, and that set of computing devices may identify the areas in which the attribute has certain criteria (e.g., greater than a threshold amount of activity), while other sets of computing devices perform the same task for different attributes. Such concurrent operations are expected to facilitate faster computation of profiles and indices than would otherwise be achieved, though not all embodiments provide for concurrent operations.

Other uses of concurrency may expedite data retrieval. For instance, querying a GIS once for each user event (e.g., a particular user being present in a tile at during a particular window of time) may be relatively slow, as the number of such events can be very large. To expedite retrieval from the GIS, some embodiments may group events to reduce queries. Such embodiments may include a master computing device (e.g., a virtualized or physical computing instance) that maps each tile to one of a plurality of other computing devices (e.g., a virtualized or physical computing instance) and instructs those devices (e.g., over a local area network in a data center) to gather data from the GIS about events occurring in their respective assigned tile or tiles. In response, the other computing devices may each filter the user events occurring within their respective tile from the obtained location histories, each forming an event group of events occurring within an assigned tile, and submit one or more queries to the GIS for attributes of the tile during relevant time periods corresponding to user events in the group (e.g., when a user was in the tile). After the responsive data is retrieved, the other computing devices may then iterate through each user having user events in the event group and join the responsive GIS data for each user with the corresponding user profile. Thus a single query, or one query per time period in question, may retrieve relevant data for a plurality of user events, thereby reducing the number of queries to the GIS and expediting analysis of user histories. Further, parallelizing the analysis for different tiles across multiple computing devices is expected to further expedite such analyses.

Further, in the above example of concurrent operation in which different tiles are assigned to different computing devices, each of the other computing devices holds in memory user profiles for users passing through the tile. This user profile data may be aggregated to calculate or update a count for the tile at a particular window of time, e.g., by counting the number of user profiles corresponding to the tile at a particular time and having a particular attribute, such as an attribute score greater than a threshold. Again, concurrent operation is expected to expedite analysis, and aggregating the user profile data corresponding to the respective tiles while this data is in memory for purposes of updating the user profiles is expected to reduce calls to the user-profile data store and speed analysis.

In some embodiments, analysis of user profiles is parallelized according to the combination of user profile and attribute, such that different computing devices analyze different attributes for a given user concurrently and different computing devices analyze different users concurrently (e.g., mapping user A, attribute X to device 1; user A, attribute Y to device 2; user B, attribute X to device 3; etc.). Again, a master computing device may map profile-attribute pairs to each of a plurality of other computing devices and instruct those devices (e.g., over a local area network in a data center) to sum the counts for those attributes for those users across all of the tiles having data for those users. For instance, the above technique may be used to analyze each of a plurality of tiles concurrently with different computing devices mapped to different tiles, and then the technique of this paragraph may be used to aggregate this data for each user profile/attribute pair across the tiles, e.g., by querying the devices analyzing tiles for data about a given user and attribute and summing (or otherwise aggregating) the responses. Again, this technique is expected to offer relatively fast concurrent operation and reduce calls to data stores that might otherwise slow the analysis.

The user-profiles resulting from the above describe processes and systems may be used in a variety of contexts. For example, as noted above, advertisements may be selected based on the user profiles. In another example, the user profiles may be used to do market research, for example, by identifying which attributes score relatively high at each of a business's locations at certain times to characterize the customers of that business. In another example, the user profiles may be used to customize the look and feel or operation of software operated by the user, for instance configuring application differently for a user known to have children relative to the look, feel, or operation presented to a user who has attribute scores that indicate that user likely does not have children.

Thus, the above-describes processes may yield user profiles in an automated fashion, at relatively low expense, and in a privacy friendly manner. Associating attributes of geographic locations visited by the user to the user's profile, and accounting for the time of day at the geographic location, and for the user, are expected to yield relatively accurate user profiles that account for the different ways people behave during different times of the day. Further, inferring intermediate locations is expected to yield a relatively high resolution characterization of users, and determining whether the user is at an adjacent location, whether adjacent locations have consistent attributes, and whether the attributes of a given location are outliers for the user are expected to further improve the quality of the user profile. It should be noted, however, that not all embodiments provide these benefits.

As noted above, in some cases, the user profiler 12 of FIG. 1 generates user profiles based on the location histories of mobile devices 16. As mentioned, in some use cases, the location histories are not acquired directly from the mobile devices 16 and are instead obtained from third parties, such as cell phone carriers, advertising networks, operators of native mobile device applications, and other entities with access to location histories from a relatively large number of users, such as tens of thousands, hundreds of thousands, or millions of users. These location histories may be provided in a location data set including location histories from a relatively large number of users collected over some duration of time, such as over the preceding hour, day, week, month, or year. In some cases, a batch process is used to generate user profiles in response to receipt of a new location data set.

As discussed above, often different providers of location data sets use different identifiers for a given user. Often, the location data set identifies users uniquely within a given data provider's system, but does not identify users canonically, as each data provider often has a different unique ID for the same user, thereby impeding efforts to match a record (e.g., a location history) about a user from one data provider with a record about the same user from another data provider. (The use of non-canonical identifiers is referred to as anonymization herein, but the intent behind the use of these inconsistent identifiers need not be to anonymize for the present techniques to apply.) Also as noted above, when users update their equipment, e.g., with a new cell phone, it can be difficult to tie their existing profile to data from the new equipment, as the user identifiers are often based on identifiers of the mobile device. Consequently, it can be difficult to use location data sets from third parties to generate user profiles.

Figure 4:
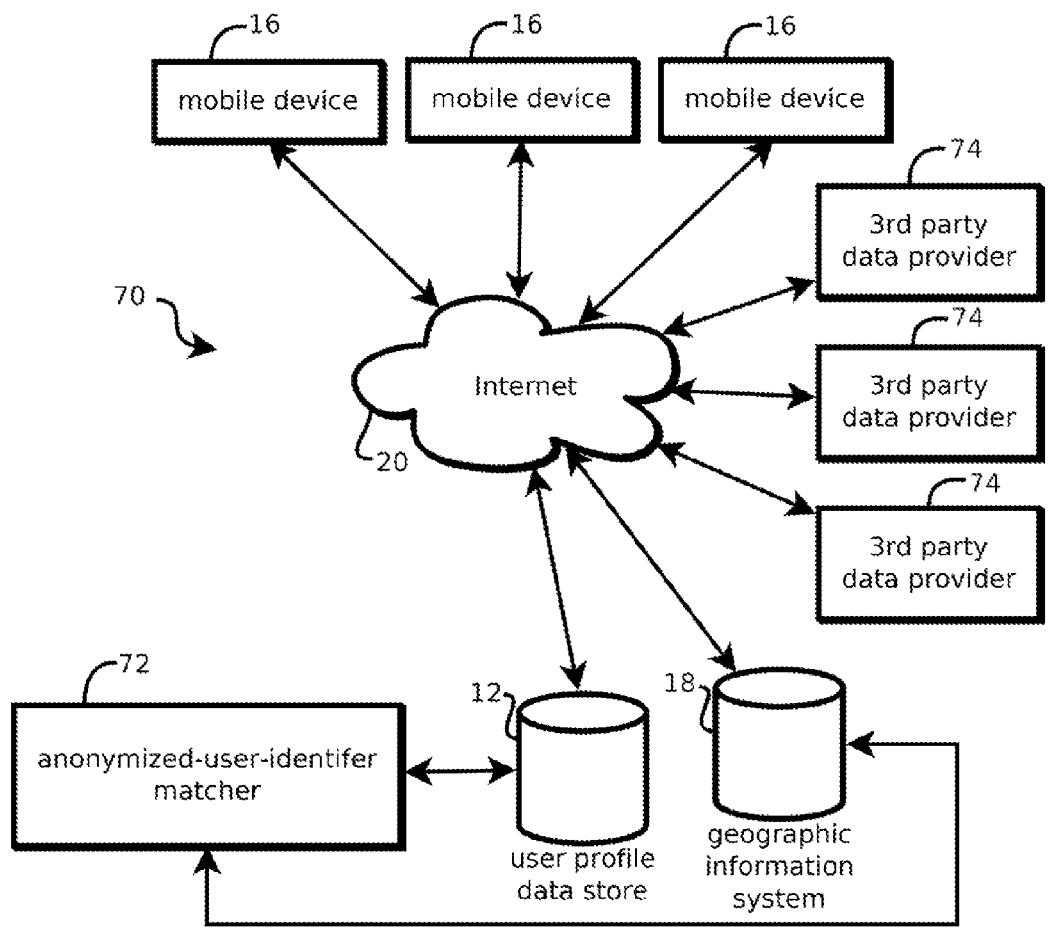
FIG. 4 shows an example of a user profiler configured to match non-canonical user identifiers in accordance with some embodiments.

FIG. 4 shows an example of a computing environment 70 configured to update user profiles based on anonymized data from multiple third-party data providers. In some cases, the computing environment 70 includes the components of the computing environment 10 of FIG. 1, as the techniques described with reference to the computing environment 70 may yield richer location histories of users that are used by the user profiler 12 to generate user profiles. As illustrated, in addition to the features shared with the computing environment of FIG. 1, the computing environment 70 of FIG. 4 includes an anonymized-user-identifier matcher 72 and a plurality of third-party data providers 74. Components 72 and 74 may be constructed from one or more properly programmed computer systems, like those described below with reference to FIG. 6, based on the operations described below.

Reference numbers shared between FIG. 4 and FIG. 1 refer to the components and features described above. That said, the techniques described below are not limited to systems having the features described above and are independently useful for other purposes, such as profiling geographic areas rather than profiling users (which is not to imply that the system above is limited to profiling users).

In some cases, the computing environment 70 of FIG. 4 executes some or all of a process described below with reference to FIG. 5 to match user identifiers across location data sets from different third-party data providers and generate (e.g., create, update, or otherwise augment) user profiles. As explained below, in some embodiments, user identifiers are matched between data providers based on similarities between time and geolocation data associated with the user identifiers in data from different data providers.

For instance, cellular records in a location data set may indicate that anonymized user ID "12Dfs93sadkg38" (e.g., a number based on a hash of the User's UDID or phone MAC address) is within a first 100-meter square geographic area for 80% of workday hours (e.g., in their workplace) and within a second 100-meter square area for 60% of weekend hours (e.g., in their home). And data from an ad network may indicate that another anonymized user ID "19371349839849302355" is associated with an account that viewed ads in the same first 100-meter tile during workday hours and in the same second 100-meter tile during weekend hours. Based on these similarities, the embodiments may determine that anonymized user ID "12Dfs93sadkg38" from the cellular records corresponds to the same user as anonymized user ID "19371349839849302355" from the ad network. Embodiments may also calculate a confidence value for the correlation based on the amount of similarity and the sample size. Based on this correlation, embodiments may generate (e.g., create, update, or otherwise augment) a user profile of the user based on data from both the cellular network and the ad network. The generated user profile may be used by advertisers to target more relevant ads to the user.

In many systems, however, the matches may be more complex than matching single tiles at one or two times of day. Often location histories for a given user span several point clouds of locations and times (e.g., each corresponding to a cluster near their work, near their home, and near businesses or roads they frequent), with each geolocation being associated with varying degrees of geographic resolution and confidences in the determination of location. Further, the location data sets are often relatively large, covering millions of users each with such a point could developed over days or weeks, such that processing the data can take a relatively long time to identify matches absent techniques to expedite the operations, such as appropriate use of concurrency and data structures configured to expedite data retrieval. Embodiments described below may accommodate this added complexity (though the present techniques are not limited to the more complex use cases).

Figure 5:
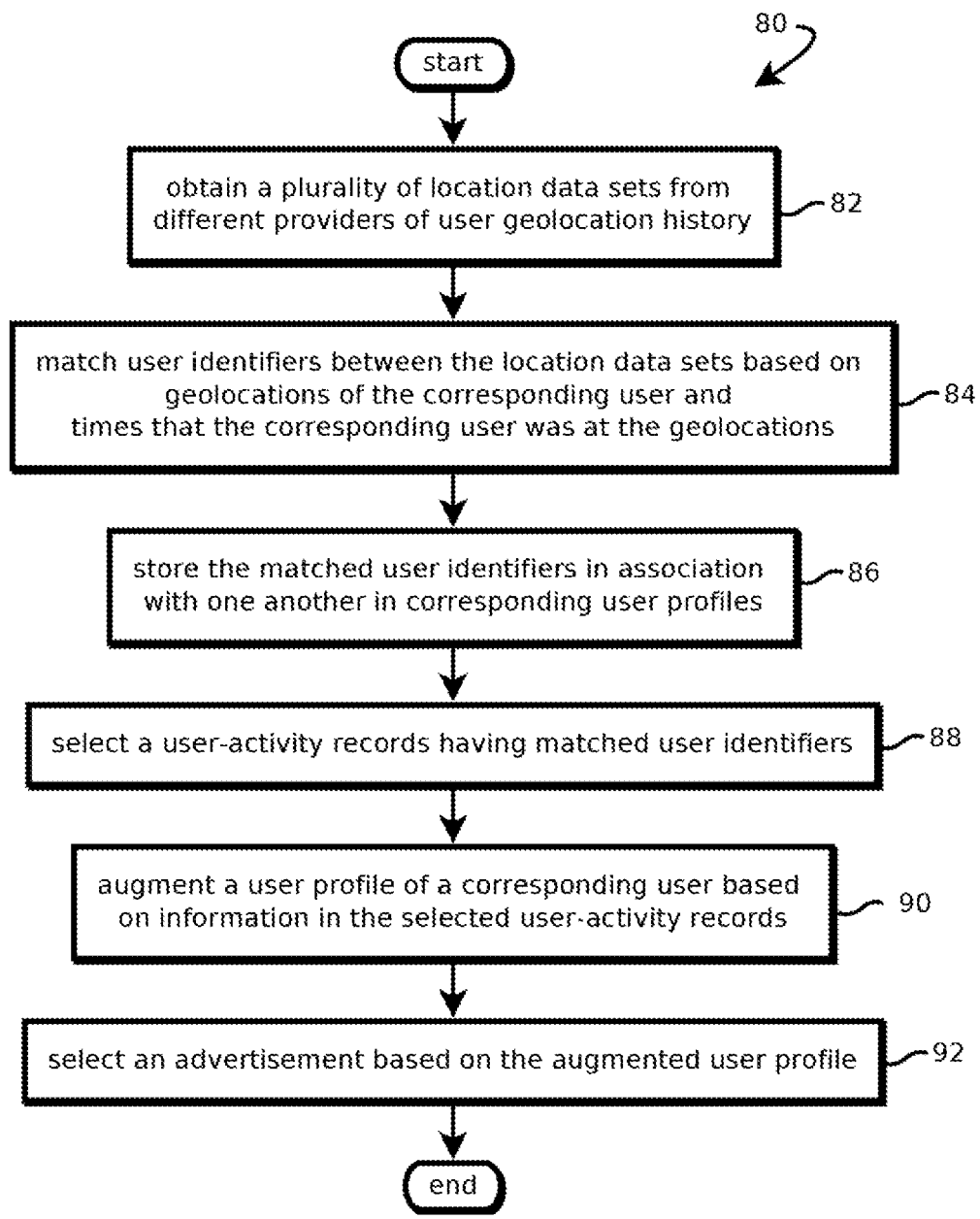
FIG. 5 shows an embodiment of a process for matching non-canonical user identifiers.

The anonymized-user-identifier matcher 72 may execute certain steps of a process shown in FIG. 5 for matching user identifiers across location data sets, using the matches to generate user profiles, and using the user profiles to select advertisements to present to the profiled users. Like the other processes described herein, embodiments are not limited to the order of the steps depicted, nor to systems that perform all of the illustrated steps, as data at intermediate stages is independently useful.

For example, more generally, embodiments may obtain a plurality of location data sets, each location data set being from a different third party data provider and having a different user identifier for a given user (e.g., an identifier based on the user's equipment or account). Each location data set may include a plurality of user-activity records. Each user-activity record describe activity (including user location history—like a sequence of time-stamped geolocations—and, in some cases, additional context, like information about the user's device or information about a computing session) of a single user on the respective third party's system. Some user-activity records include only a list of user-identifiers and associated location histories, and some user-activity records include additional context. Additionally, each user-activity record has a user identifier that is unique among other users of that system (e.g., a hash of the user's MAC address or phone number), but does not serve to explicitly identify (e.g., with a string text match) the user in records from other third party systems, e.g., because those other systems use a different hash algorithm or different input data for forming an anonymized user ID.

Some embodiments of the process 80 include obtaining a plurality of location data sets from different providers of user geolocation history, as shown in block 82. As noted above, in some cases, geolocations are obtained by the third-party data providers 74 based on wireless signals sent by or received from the mobile user devices 16. Examples of such wireless signals include wireless signals from satellite positioning systems sensed by a global positioning system location sensor on the mobile user devices 16. Other examples include cell tower triangulation of the mobile user device, for instance, performed by, or at the behest of, operators of cellular networks, or wirelessly transmitted locations sent from the mobile user devices to the cellular networks.

In some cases, a native mobile application (e.g., as downloaded from a pre-approved collection of such applications on a platform hosted by an entity providing an operating system for the mobile device) on the mobile user devices 16 queries the operating system of the device to obtain a geographic location of the device. For example, some examples of native applications executing the iOS™ operating system may instantiate a member of the CLLocationManager class provided within that operating system and use methods of the class to obtain the geolocation of the mobile user device. In another example, some examples of native applications executing on the Android™ operating system may instantiate a member of the LocationProvider class provided by the operating system and use methods of the class to obtain the geolocation of the mobile user device. In some cases, third parties may distribute native applications on multiple operating systems, and different mobile user devices having the different operating systems may report back geolocation for inclusion in a single location data set.

Each location data set may include location histories of a relatively large number of users, e.g., more than ten thousand or more than one million. Within a location data set, the location histories may span some duration of time, for instance, the previous hour, day, week, or month (though the trailing duration need not extend to the current time). Each location history may include a plurality of time-stamped geolocations documenting the geographic location of a mobile user device over time (e.g., at times a native application is interacted with by a user or at times an advertising network serves an ad to the user, e.g., in a mobile web browser). In some cases, the location histories for a given user include more than ten, more than a hundred, or more than a thousand time-stamped geolocations, depending on the fidelity of the data. In some cases, the geolocations are expressed with coordinates, such as latitude and longitude, with varying levels of significant digits (or other measures of granularity) among the data providers. Or in some cases, for some providers, the geolocations are expressed with reference to some other geographic area, such as zip codes, or advertising designated marketing area (DMA). In some cases, each geographic location is associated with a geolocation confidence score indicative of the reliability of the measured location, e.g., 80% confidence radius based on the quality of GPS signals received, or a percentage indicative of the confidence that the device is within some predetermined radius, such as within 100 meters of the reported geolocation. Different data providers may provide location data sets with different permutations of the preceding attributes of location histories.

For each location data set, embodiments may generate (e.g., extract, validate, and normalize) a plurality of user-location records from the data set, the user-location records being normalized location histories, e.g., from user activity records in the location data sets. Each user-location record may include the third-party user identifier for the respective location data set and a set of time-stamped geolocations of the user (e.g., latitude and longitude coordinates, or identifiers of geographic areas, such as identifiers of tiles). In some cases, the time-stamps describe a duration of time during which the user was in the area.

In some cases, the user activity records are normalized so that locations and times from different third-party data providers are expressed in the same format, for instance, by converting expressions of time using one set of units into expressions of time using a common set of units (such as the units of the tile times discussed above) and by converting expressions of geolocation using one set of units (such as latitude and longitude or zip code) into expressions of geolocation using a common set of units, such as the above-described tiles.

Normalizing times to the above-described times of the time-tile records may make the matching process relatively sensitive to periodic behavior of users, as the time-tile records in some embodiments correspond to activities in a work-week cycle. This is expected to improve accuracy relative to non-periodic detection techniques for users who generally follow a weekly schedule, such as weeks in which they spend more time on the weekend at home and more time during the workweek in the office. Other periodic cycles may be used, e.g., a daily periodic cycle. Or, other embodiments may normalize time to a non-periodic value, such as a number of minutes or hours since an arbitrary date to account for non-periodic behavior of users.

In some cases, some location data sets may use relatively low-resolution expressions of geolocation, such as a zip code, or a latitude and longitude with relatively few significant digits. In some cases, a single geolocation from a third party location data set may correspond to multiple tiles. In some cases, normalization may include converting the low-resolution geolocation to a center tile among the corresponding multiple tiles (for instance, selecting a centroid tile in a collection of tiles covering a zip code). In other cases, a single low-resolution geolocation from a third party data provider may be normalized by mapping that geolocation to a plurality of tiles covering the corresponding low-resolution geolocation (such as all of the tiles covering a zip code). In this example, the plurality of tiles corresponding to a single low-resolution input geolocation may be assigned a weight, such as the reciprocal of the number of tiles to which the single low-resolution input geolocation is mapped, and that weight may be accounted for when matching clusters from different location data sets. For instance, a center of gravity that accounts for the weight of the vectors may be calculated for each cluster, and clusters may be compared based on differences in distance between the centers of gravity.

Additionally, in some cases, confidence scores for geolocations in location data sets may be normalized with a variety of techniques. In some implementations, the confidence scores are ignored, e.g., when large sample sizes are sufficient to overcome noise. In another example, weights may be assigned to time-location vectors based on (e.g., as an inverse function of) the confidence scores, for instance, assigning a weight of 0.8 to a vector based on an 80% confidence score. Such weights may be accounted for when matching clusters from different location data sets, e.g., using the technique described above.

Some embodiments of process 80 may include matching user identifiers between the location data sets based on geolocations of the corresponding user and times that the corresponding user was at the geolocations. For each user-location record of a given data set, embodiments may search other data sets for corresponding user-location records. For instance, for the respective user-location record of the given data set, embodiments may calculate time-location vectors for each location-time-stamp pair in each user-location record (e.g., with scalars of latitude (or a tile-count equivalent), longitude (or a tile-count equivalent), and time-period elapsed since a fixed reference, or time of the week to capture periodic behavior associated with the work week).

To prepare to match user identifiers across location data sets, some embodiments may then identify clusters among the vectors using, for instance, various centroid-based clustering algorithms (e.g., k-means), density-based clustering algorithms (e.g., DBSCAN), or distribution-based clustering algorithms (e.g., a Gausian distribution model). As a result, each location data set may include a plurality of cluster records, each cluster record corresponding to a user identifier in the at location data set, and each cluster record including one or more clusters of time-location vectors based on the location histories of that user. Some embodiments may then perform this vectorization and clustering process for each user-location record in the other data sets, yielding additional sets of clusters, each set being associated with a user identifier of the respective location data set.

To expedite operations, some embodiments may cluster location histories for multiple user identifiers concurrently. For instance, a plurality of processes executing on a plurality of computers may concurrently perform a process of 1) requesting a location history for a given user identifier; 2) clustering the location history; 3) returning a set of clusters for the location history of the given user identifier; 4) repeating. In some cases, the dimensions of the clusters may be reduced as part of forming the clusters to reduce memory access time of processes and data transfer times between processes. For instance, a cluster may be represented as a center point (e.g., a centroid or center of mass for weighted vectors) and a radius. Or a cluster may be represented in output of the clustering process by a bounding volume, such as a convex hull of the points in the cluster.

These sets of clusters for a given user identifier may be compared to sets of clusters for user identifiers in other location data sets to match user identifiers across location data sets. To this end, embodiments may perform a matching process for each user identifier in a given location data set. The matching process for a given user identifier may include: 1) obtaining the cluster record for the given user identifier in the location data set (which may be referred to as having the reference cluster set); 2) obtaining all cluster records for another location data set; and 3) determining which cluster record in the other location data set has a cluster set (called a comparison cluster set) most similar to that of the reference cluster set. The user identifier of the most similar comparison cluster set may be deemed a match to the user identifier of the reference cluster set.

Thus, to match user identifiers, in each of the other data sets, the user-location record with the most similar comparison clusters to the reference clusters may be deemed a matching user-location record. In some cases, a similarity score is calculated for each pair of reference cluster and comparison clusters, and the similarity score must exceed a threshold to constitute a match. When multiple comparison clusters exceed the threshold, the most similar comparison cluster may be deemed a match, or the most similar cluster may be deemed a match without regard to a threshold.

Similarity scores may be calculated with a variety of techniques, including based on a Euclidean distance between centroids of the clusters being compared (or based on Euclidean distance of centers of mass for weighted vectors) or based on a volume of overlap of convex hulls of the clusters. For instance, a root mean square of the Euclidean distances between each cluster in a reference cluster set to a closest cluster in a comparison cluster set may be calculated as a similarity score. Or, in another example, the similarity score may be the percentage of the overlapping convex hull volume to the sum of volumes of the convex hulls of clusters in a reference cluster set and a comparison cluster set.

Because matching may be a time-intensive process for data sets with a large number of user identifiers, some embodiments may expedite processing with various techniques. For instance, some embodiments may execute concurrent matching processes in which each of a plurality of different processes (e.g., more than ten, one hundred, or one thousand) is assigned a different reference cluster set to which a match is to be found. To expedite matching, some embodiments may group or sort and store the comparison cluster sets according to location (or time), so that unviable comparison cluster sets may be quickly discarded and likely matches may be quickly identified. For instance, the comparison cluster sets may be grouped according to the US state most heavily represented among their constituent clusters and the reference cluster set may be similarly grouped. The reference clusters set may then only be compared to comparison cluster sets in the same or adjacent US states (or other arbitrary geographic areas of varying size may be used for grouping). Or the comparison cluster sets may be pre-sorted. For instance, a centroid of the comparison cluster sets may be determined, and comparison cluster sets may be sorted according to location of the centroid on a space filling curve, like a z-curve. Embodiments may then search only within a threshold distance on the space filling curve for matches.

Embodiments may proceed through each of the other data sets, searching the matching user-location records in the remaining data sets for each user-location record in the other data set that has not yet been matched. Thus, embodiments may start, for example, with cellular carrier data from which reference clusters are formed and matched to other data sets and then proceed through those other data sets, e.g., a data set from an ad network, and form reference clusters for, for example, the ad network to be matched.

In some cases, information beyond time and location may be used for matching. For instance, in some embodiments, each user-activity record includes additional information about the mobile user devices, such as an operating system type, a device manufacturer identifier, a component manufacturer or version identifier, a software maker or version identifier, or the like. Some embodiments may use this additional information to match user identifiers across data sets from different third-party data providers. For example, candidate matches may be filtered based on whether this additional information is consistent across user activity records from two different location data sets. A cluster set from location data set A for a given user identifier may align relatively closely in time-location vector space with the cluster set from location data set B associated with another, potentially corresponding user identifier, and upon detecting this potential match, some embodiments may then determine whether any additional information in the data set A for the potentially corresponding user is inconsistent with that of data set B, determining, for instance, to reject the match in response to determining that the operating system is different, the component manufacturers different, or the like. Upon rejecting a match, embodiments may then evaluate the next closest match in response.

In other cases, the same user may use different mobile user devices to interact with systems of different third-party data providers, for example, using a tablet for certain third-party data providers services and using a cell phone for other third-party data provider services. To account for this use case, some embodiments may ignore differences in the other aspects of user activity records, such as different device manufacturers, and match user identifiers based on activity occurring on different devices with patterns that overlap or a similar in space and time.

In some cases, the preceding steps of process 80 may be performed by component 72 of FIG. 5, while the subsequent steps may be performed by the components described with reference to FIG. 1. Next, in the process 80, some embodiments store the matched user identifiers in association with one another in corresponding user profiles, e.g., in the above-described profiles, as shown in block 86. The user-identifiers of the matching user-location records may be stored in association with one another in memory, e.g., in a canonical user-identifier record, having the matching user-identifiers from the different data sets and a canonical user identifier associated with a user profile of the user. In some cases, each link to a user identifier is also associated with a confidence score based on (e.g., equal to) the similarity score of the clusters. Examples of the user profiles are described in U.S. patent application Ser. No. 13/734,674, filed Jan. 4, 2013, which is hereby incorporated by reference in its entirety for all purposes.

Some embodiments of process 80 then select a user-activity records having matched user identifiers and augment a user profile of a corresponding user based on information in the selected user-activity records, as shown in blocks 88 and 90. Finally, some embodiments may select an advertisement based on the augmented user profile, as shown in block 92.

Embodiments are not limited to matching across data sets from different third party location data set providers. In some cases matching may be performed within location data sets from a single provider, or from a single provider to an existing user profile.

In some cases, user-location records within a single data set are matched to detect that a user has begun using a new computing device. For example, a user may acquire a new cell phone, and a carrier may calculate a different user identifier hash value based on a different MAC address of the new phone. As a result, the new user-activity records for the user will generally not tie to the older user-activity records for the same user, due to different resulting user identifiers calculated based on different attributes of the user's computing device. Embodiments may mitigate this problem by matching the new user identifier to the user identifier from the same data provider corresponding to the user's older cell phone, or other user computer device. The correspondence may be stored in memory, and records from the data provider relating to either the older or the newer user identifier may be used to augment the same user profile. Consequently, in some cases, an existing user profile may continue to be used even when the user switches to new computing equipment (or a new account, or other aspect from which an anonymized user identifier is determined by the data provider).

Further, in some cases, user-location records in a user profile are matched to the given data set, rather than (or in addition to) matching directly between data sets. For example, user profiles may be associated with a user-location record that is augmented with additional time-stamped user locations as new data sets are matched to that profile and as additional data is acquired from the data providers.

Figure 6:
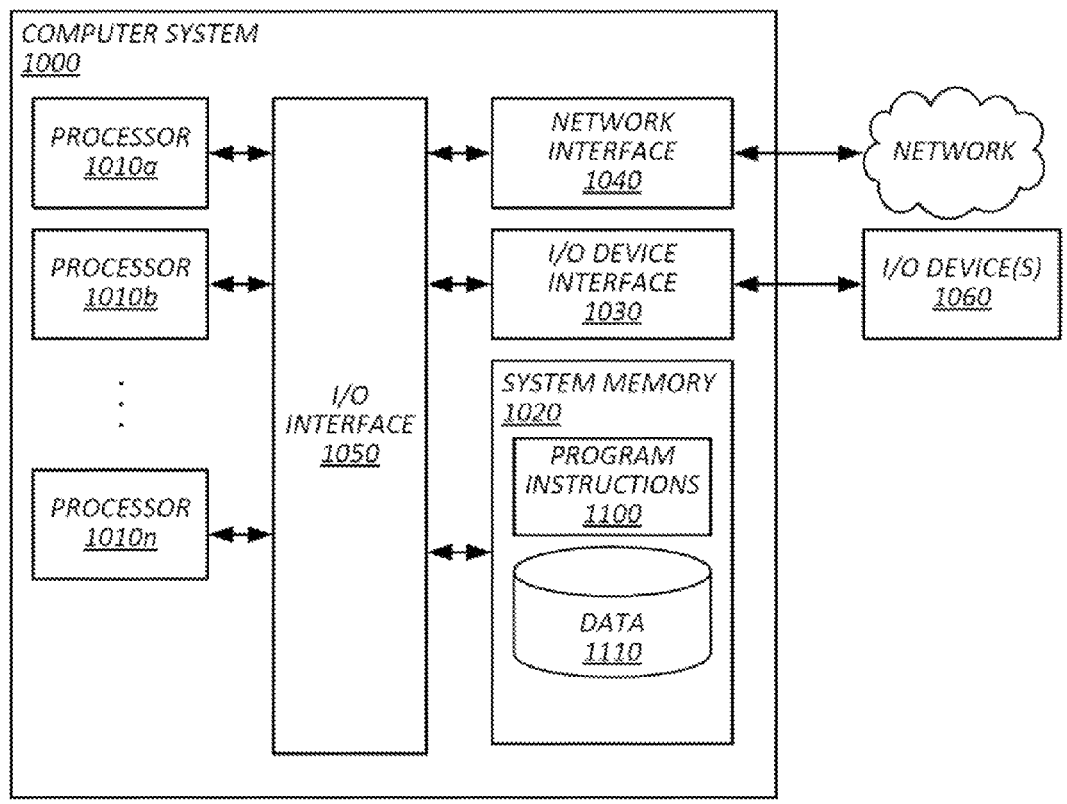
FIG. 6 shows an embodiment of a computer system by which the above-mentioned systems and processes may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A method of generating user profiles, the method comprising:
   obtaining a plurality of location data sets from different providers of user geolocation history, each location data set including a plurality of user-activity records, each user-activity records being associated with a user identifier and including geolocations of the corresponding user and times that the corresponding user was at the geolocations, the different providers having different user identifiers for a given corresponding user;
   matching, by one or more processors, the user identifiers between the location data sets based on geolocations of the corresponding user and times that the corresponding user was at the geolocations; and
   storing the matched user identifiers in association with one another in corresponding user profiles, wherein:
   the geolocations are sensed based on wireless signals received by or transmitted from mobile user devices;
   the location data sets are anonymized such that no canonical user identifier is present for the corresponding users across the plurality of location data sets;
   at least some of the location data sets are obtained with a batch process such that the at least some of the location data sets contain data collected over at least an hour;
   the user identifiers uniquely identify each corresponding user within a corresponding location data set; and
   the location data sets comprise:
      a first location data set having a plurality of user location histories from a cell carrier indicative of geolocations of cellular phones while on a cellular network of the cell carrier; and
      a second location data set having geolocations obtained by native applications executing on at least some of the cellular phones, the native applications being provided by an entity different from the cell carrier, at least some of the native-application-obtained geolocations being obtained by a LocationProvider class of a first object oriented program executing on at least some of the cellular phones and at least some of the native-application-obtained geolocations being obtained by a CLLocationManager class of a second object oriented program executing on at least some of the other cellular phones.

2. The method of claim 1, comprising:
calculating a confidence value for a respective match of the user identifiers based on a sample size of the user-activity records upon which the respective match is based and an amount of similarity between the geolocations of the corresponding user in the different location data sets subject to the respective match, an amount of similarity between the times that the user was at the geolocations in the different data sets subject to the respective match, or both.

3. The method of claim 1, comprising generating user-location records from the user activity records by extracting geolocations and normalizing the extracted geolocations, wherein the normalized geolocations are matched when matching the user identifiers between the location data sets.

4. The method of claim 3, wherein normalizing the extracted geolocations comprises:
translating the extracted geolocations into corresponding tiles of a geographic information system.

5. The method of claim 3, wherein normalizing the extracted geolocations comprises:
translating the extracted geolocations and times that the corresponding user was at the geolocations into time-tiles associated with tile-time records of a geographic information system.

6. The method of claim 1, wherein matching the user identifiers between the location data sets comprises:
converting the geolocations of the corresponding user and times that the corresponding user was at the geolocations into time-location vectors;
clustering the time-location vectors; and
determining that the user identifiers across the location data sets match based on a measure of similarity of clusters from the locations data sets.

7. The method of claim 6, wherein the measure of similarity includes a distance in vector space between a measure of central tendency of two of the clusters.

8. The method of claim 7, wherein the measure of central tendency is a centroid vector of the corresponding cluster.

9. The method of claim 1, wherein matching the user identifiers between the location data sets comprises:
vectorizing the geolocations of the corresponding user and times that the corresponding user was at the geolocations to produce a measure of central tendency of two of the clusters;
clustering the time-location vectors within each location data set to produce clusters for each location data set; and
matching a cluster selected from one location data set among the plurality of location data sets with another cluster from another location data set among the plurality of location data sets.

10. The method of claim 9, wherein matching the cluster selected from one location data set with the other cluster from the other location data set comprises:
calculating a similarity score for the cluster and the other cluster; and
determining that the similarity score satisfies a threshold.

11. The method of claim 9, wherein matching the cluster selected from one location data set with the other cluster from the other location data set comprises:
calculating a Euclidean distance between centroids of the cluster selected from one location data set with the other cluster from the other location data set.

12. The method of claim 9, wherein matching the cluster selected from one location data set with the other cluster from the other location data set comprises:
calculating a volume of overlap of convex hulls of the cluster selected from one location data set with the other cluster from the other location data set.

13. The method of claim 1, comprising:
select a user-activity records having matched user identifiers;
generating a user profile of a given corresponding user based on information in the selected user-activity record; and
selecting an advertisement based on the generated user profile.

14. A system for generating user profiles, the system comprising:
one or more processors; and
memory storing instructions that when executed by the one or more processors effectuates operations comprising:
obtaining a plurality of location data sets from different providers of user geolocation history, each location data set including a plurality of user-activity records, each user-activity records being associated with a user identifier and including geolocations of the corresponding user and times that the corresponding user was at the geolocations, the different providers having different user identifiers for a given corresponding user;
matching, by one or more processors, the user identifiers between the location data sets based on geolocations of the corresponding user and times that the corresponding user was at the geolocations; and
storing the matched user identifiers in association with one another in corresponding user profiles, wherein:
the geolocations are sensed based on wireless signals received by or transmitted from mobile user devices;
the location data sets are anonymized such that no canonical user identifier is present for the corresponding users across the plurality of location data sets;
at least some of the location data sets are obtained with a batch process such that the at least some of the location data sets contain data collected over at least an hour;
the user identifiers uniquely identify each corresponding user within a corresponding location data set and
the location data sets comprise:
a first location data set having a plurality of user location histories from a cell carrier indicative of geolocations of cellular phones while on a cellular network of the cell carrier; and
a second location data set having geolocations obtained by native applications executing on at least some of the cellular phones, the native applications being provided by an entity different from the cell carrier, at least some of the native-application-obtained geolocations being obtained by a LocationProvider class of a first object oriented program executing on at least some of the cellular phones and at least some of the native-application-obtained geolocations being obtained by a CLLocationManager class of a second object oriented program executing on at least some of the other cellular phones.

15. The system of claim 14, comprising:
calculating a confidence value for a respective match of the user identifiers based on a sample size of the user-activity records upon which the respective match is based and an amount of similarity between the geolocations of the corresponding user in the different location data sets subject to the respective match, an amount of similarity between the times that the user was at the geolocations in the different data sets subject to the respective match, or both.

16. The system of claim 14, comprising generating user-location records from the user activity records by extracting geolocations and normalizing the extracted geolocations, wherein the normalized geolocations are matched when matching the user identifiers between the location data sets.

17. The system of claim 16, wherein normalizing the extracted geolocations comprises:
translating the extracted geolocations into corresponding tiles of a geographic information system.

18. The system of claim 16, wherein normalizing the extracted geolocations comprises:
translating the extracted geolocations and times that the corresponding user was at the geolocations into time-tiles associated with tile-time records of a geographic information system.

19. The system of claim 14, wherein matching the user identifiers between the location data sets comprises:
converting the geolocations of the corresponding user and times that the corresponding user was at the geolocations into time-location vectors;
clustering the time-location vectors; and
determining that the user identifiers across the location data sets match based on a measure of similarity of clusters from the locations data sets.

20. The system of claim 19, wherein the measure of similarity includes a distance in vector space between a measure of central tendency of two of the clusters.

21. The system of claim 20, wherein the measure of central tendency is a centroid vector of the corresponding cluster.

22. The system of claim 14, wherein matching the user identifiers between the location data sets comprises:
vectorizing the geolocations of the corresponding user and times that the corresponding user was at the geolocations to produce a measure of central tendency of two of the clusters;
clustering the time-location vectors within each location data set to produce clusters for each location data set; and
matching a cluster selected from one location data set among the plurality of location data sets with another cluster from another location data set among the plurality of location data sets.

23. The system of claim 22, wherein matching the cluster selected from one location data set with the other cluster from the other location data set comprises:
calculating a similarity score for the cluster and the other cluster; and
determining that the similarity score satisfies a threshold.

24. The system of claim 22, wherein matching the cluster selected from one location data set with the other cluster from the other location data set comprises:
calculating a Euclidean distance between centroids of the cluster selected from one location data set with the other cluster from the other location data set.

25. The system of claim 22, wherein matching the cluster selected from one location data set with the other cluster from the other location data set comprises:
calculating a volume of overlap of convex hulls of the cluster selected from one location data set with the other cluster from the other location data set.

26. The system of claim 14, comprising:
select a user-activity records having matched user identifiers;
generating a user profile of a given corresponding user based on information in the selected user-activity record; and
selecting an advertisement based on the generated user profile.

* * * * *